United States Patent Office 2,994,608

Patented Aug. 1, 1961

2,994,608
REPRODUCTION MATERIAL

Maximilian P. Schmidt and Oskar Süs, Wiesbaden, Biebrich, Germany, assignors, by direct and mesne assignments, to Azoplate Corporation, Murray Hill, N.J., a corporation of New Jersey No Drawing. Original application Feb. 17, 1956, Ser. No. 566,093. Divided and this application Apr. 2, 1958, Ser. No. 725,803
Claims priority, application Germany Feb. 25, 1955
18 Claims. (Cl. 96—33)

The present invention concerns the production of copies from originals. More particularly, it is concerned with the production of a material comprising a support layer coated with a light sensitive water soluble or water swellable colloid layer.

For several decades, papers and foils which were light sensitized by means of diazo compounds have been in use in the graphic arts. They are widely used for the reproduction of drawings and other transparent originals. Many attempts have been made in the photo-reproduction field to replace the chromates, which in combination with water soluble colloids, are used in a series of technically important processes, e.g. in copper intaglio printing, zinc plate printing, offset printing, photo-lithographic processes, and in the production of pigment papers. Recently, suggestions have been made to replace the chromates used in offset printing, by higher molecular diazo compounds.

However, in those diazotype processes in which water soluble colloids must be used for the production of tanned images, e.g. for making collotypes or for the copper intaglio printing process, chromates are still used, in spite of their being poisonous and having other disadvantages.

It is one object of the present invention to provide a novel reproduction material consisting of a layer support and a light sensitive, water soluble or water swellable colloid layer coated thereon, free from chromates, which can be used for the production of tanned images.

A further object of the invention is the use of certain quinone diazides in a colloid layer coated on a base material to produce tanned images upon exposure to a light image.

The light sensitive substances to be used according to this invention in the colloid layer are sulfonic or carboxylic acids, and the salts of such sulfonic or carboxylic acids, of p-quinone-diazide carboxylic acid amides, the amides containing two or more p-quinone-diazide amide groups in their molecules. The colloid being the most important component of the novel reproduction material, these light sensitive substances are mostly used in a minor amount as compared with the amount of colloid in the colloid layer. The major portion of the layer is in general the colloid. Layers containing more than 60% of the light sensitive substance are not within the scope of this invention.

The reproduction material prepared according to the present invention, after it is exposed under a transparent original and developed by treatment with water, results in tanned images which are very suitable for numerous purposes in the reproduction field.

Heretofore it was known that neither the ortho- and para-benzoquinone-diazide sulfonic acids and para-naphthoquinone-diazide sulfonic acids, nor the sulfonic acids of o-quinone-diazide esters or o-quinone-diazide sulfonic acid amides (even if they contained several light sensitive o-quinone diazide residues in their molecules) were capable of hardening water soluble colloids to such a degree that suitable tanned images are obtained by light exposure and subsequent development with water. It was, therefore, very surprising to determine that the specific group of bis-compounds of the invention could accomplish the purpose.

The compounds, which must be present as the light sensitive substance in the colloidal layer, can be mixed with various water soluble or water swellable colloids and then be used for the production of light sensitive layers, by coating the solution onto a suitable support, in a manner similar to the way known chromate layers are made.

Colloids suitable for use in accordance with the present invention are either natural colloids, such as gelatine or casein; or synthetic colloids, e.g. highly viscous polyvinylpyrrolidones, acrylic acid amides, polyvinyl alcohol, or similar water soluble or water swellable substances. Dyestuffs, sensitizers, pigments or plasticizers, e.g. glycerine, may be added to the colloid layers, as well as other additives customarily used in diazotype processes.

According to one method of the present invention, a water swellable colloid layer, e.g. a gelatine or cellulose hydrate layer, is sensitized by coating it with a solution of the compound to be used as the light sensitive substance.

One method of producing the light sensitive substance in the colloid layer is, for example, by causing p-quinone-diazide-carboxylic acid chlorides to react with aromatic amino sulfonic acids or amino carboxylic acids, containing two or more amino groups in their aromatic nucleus. Alternatively, the sulfonic acids and carboxylic acids of p-nitro-hydroxyl-aryl carboxylic acid amides, which are prepared by known methods, are first reduced to the corresponding p-amino-hydroxy compounds and then transformed into the sulfonic acids and carboxylic acids of p-quinone-diazide-carboxylic acid amides, by diazotization.

If the visibility of the tanned images of the invention, obtained after exposure to light, should not be good enough, they can be colored before or after development with water by using dyestuff solutions of, e.g. basic dyestuffs, such as methylene blue or methyl violet. Frequently, a further hardening of the images results from such coloration. However, such hardening effect may also be obtained by an after-treatment with a tanning agent, e.g. formaldehyde.

Suitable base materials or supports for the light sensitive colloid layers may be: paper, films, plastic foils, metal foils, metal plates and metal cylinders, e.g. of aluminum, zinc, copper or brass, or they may be of glass or textile fabrics.

The light sensitive reproduction material according to the present invention may be used for all processes in which chromates were hitherto used for sensibilization, especially for intaglio and offset printing. It is also of practical importance in obtaining pigment images, copying originals, or for the production of stencils.

The light sensitive layers according to the present invention have an excellent shelf life. As compared with the diazo and nitro compounds previously proposed for the production of tanned images, the new material has the advantage that it bleaches out more strongly, thus avoiding weakness in contrast of the images obtained.

The following compounds are discussed in further detail in the examples:

(1)

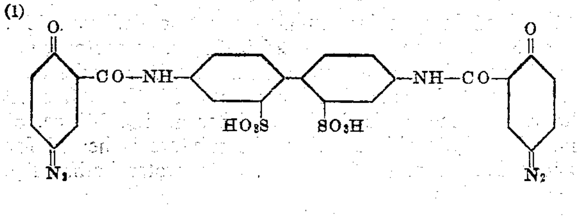

(2)

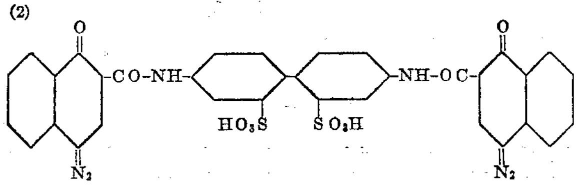

*Example 1*

0.15 g. of the diazo compound corresponding to Formula 1 is suspended in 85 cc. of 50% aqueous alcohol, and then dissolved by neutralizing with sodium bicarbonate. The solution is then combined with 15 cc. of a 10% aqueous solution of highly viscous polyvinyl pyrrolidone and filtered. The solution is coated as a thin layer onto an aluminum foil, then dried and then exposed under a transparent original. The exposed layer is colored with a basic dyestuff, e.g. methyl violet, and treated with water. This causes the unexposed parts of the colloid layer to be removed from the foil. A colored negative image of the original is obtained and now the imaged foil may be used as a printing plate in an offset printing process.

The diazo compound corresponding to Formula 1 is prepared as follows:

92 g. of 4,4''-diamino-diphenyl-2,2'-disulfonic acid are dissolved in 800 cc. of 10% sodium carbonate solution. While heating to 70–75° C., 130 g. of 1-chloro-4-nitrobenzene-2-carboxylic acid chloride are added to this solution. After heating for another hour, the bis-carboxylic acid amide formed is dissolved by adding a small quantity of a 10% sodium hydroxide solution and then re-precipitated by adding hydrochloric acid (about 30%) while agitating and cooling. The reaction product precipitates first in the form of an oil, which, upon vigorous rubbing turns into a crystalline mass.

14 g. of the bis-carboxylic acid amide are mixed with 30 g. of acetamide and 70 g. of anhydrous sodium acetate, and then heated to 160° C. for two hours. The hot molten mass is poured into a saturated sodium chloride solution, thus causing the sodium salt of the bis-amide of 1-hydroxy-4-nitro-benzene-2-carboxylic acid with benzidine-2,2'-di-sulfonic acid, to precipitate. Subsequently, it is washed with alcohol.

The sodium salt of the nitro compound is catalytically reduced in the presence of Raney nickel, and the amino compound thus formed is converted by diazotization, in hydrochloric solution, into the bis-amide of benzoquinone-(1,4)-diazide-(4)-2-carboxylic acid with 4,4'-diamino-diphenyl-2,2'-di-sulfonic acid corresponding to Formula 1. According to our analysis the resulting compound is the free acid.

*Example 2*

0.15 g. of the diazo compound corresponding to Formula 2 and 1.5 g. of a highly viscous polyvinyl pyrrolidone are dissolved in 100 cc. of 95% ethylene monomethyl glycol ether. A roughened aluminum foil is coated with this solution, dried and then exposed under a negative original. The image side is then rinsed with water, and, finally, the positive tanned image obtained is colored with a 3% solution of methyl violet. Thus, a positive printing plate is obtained.

The diazo compound corresponding to Formula 2 is prepared as follows:

3.4 g. of benzidine-2,2'-disulfonic acid are dissolved in 30 cc. of water, containing also 1.6 g. of sodium bicarbonate. After adding 2.5 g. of chalk to the solution, 5.6 g. of 1-(carbethoxy)-hydroxy-2-naphthoic acid chloride (described in "Liebigs Annalen der Chemie," vol. 391, page 352), which are dissolved in 25 cc. of acetone, are carefully added to the solution drop by drop, while constantly agitating and heating to 50–60° C. After 10 hours the reaction is finished. After adding 200 cc. of n-sodium hydroxide solution, the mixture is heated for about five hours to 60–70° C. on a water bath. The weakly red colored solution is filtered off from the solid chalk and mixed with as much hydrochloric acid as is necessary to obtain a Congo red reaction. The N,N'-bis-(1''-naphthol-2''-carbonyl)-benzidine-2,2'-disulfonic acid which percipitates as a colorless precipitate is recrystallized from a dimethyl formamide-water mixture.

2.5 g. of the latter described compound are dissolved in 25 cc. of n-sodium hydroxide solution and then at a temperature of 0–5° C. and while constantly agitating, coupled with the corresponding quantity of benzene-diazonium chloride, using a solution of the diazonium chloride. By acidifying the alkaline solution with concentrated hydrochloric acid, the azo dyestuff is precipitated.

3 g. of the azo dyestuff are dissolved in 200 cc. of n/10 sodium hydroxide solution and reduced with sodium dithionite by heating on a water bath to 80–90° C., until discoloration occurs. The reaction mixture is acidified with concentrated hydrochloric acid to the Congo red reaction. 1.6 g. of N,N'-bis(1''-hydroxy-4''-amino-naphthalene-2''-carbonyl)-benzidine-2,2'-disulfonic acid are obtained.

1.6 g. of this p-amino-hydroxy compound are suspended in 30 cc. of dimethyl formamide and 2.6 cc. of concentrated hydrochloric acid, while agitating. 0.75 cc. of a 40% sodium nitrite solution are added to the suspension while cooling to a temperature between 0 and 5° C., and the reaction mixture is then left standing for 12 hours at room temperature. The clear red solution thus obtained is filtered with animal charcoal and the filtrate mixed with 50–60 cc. of water. The diazo compound corresponding to Formula 2 precipitates as a brownish-yellow precipitate. Yield is 0.9 g.

This application is a division of application Serial No. 566,093, filed February 17, 1956.

What is claimed is:

1. Light-sensitive material comprising a base material coated with a layer comprising an organic colloid and a compound having the formula $$R—CO—NH—R_2—NH—CO—R_1$$

in which R and $R_1$ are quinone-(1,4)-diazide radicals, and $R_2$ is an arylene radical having at least one $—SO_3H$ substituent.

2. Light-sensitive material comprising a base material coated with a layer comprising an organic colloid and a compound having the formula

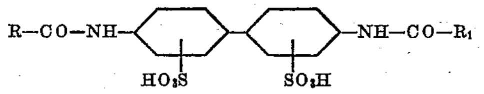

in which R and $R_1$ are quinone-(1,4)-diazide radicals.

3. Light-sensitive material comprising a base material coated with a layer comprising an organic colloid and a compound having the formula

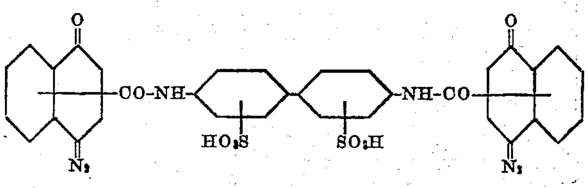

4. Light-sensitive material comprising a base material coated with a layer comprising an organic colloid and a compound having the formula

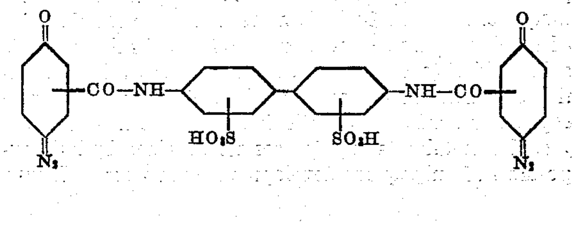

5. Light-sensitive material comprising a base material coated with a layer comprising an organic colloid and a compound having the formula

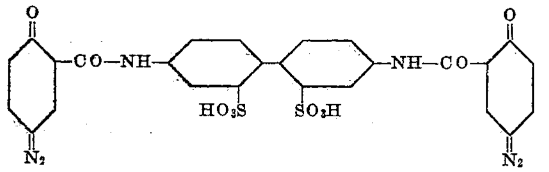

6. Light-sensitive material comprising a base material coated with a layer comprising an organic colloid and a compound having the formula

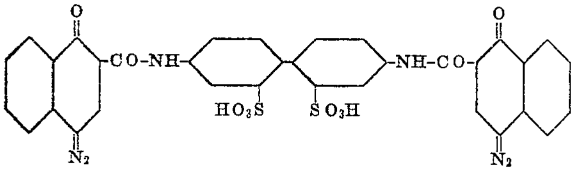

7. A method of making light-sensitive material which comprises coating a base material with a layer comprising an organic colloid and a compound having the formula $$R—CO—NH—R_2—NH—CO—R_1$$

in which R and $R_1$ are quinone-(1,4)-diazide radicals, and $R_2$ is an arylene radical having at least one $—SO_3H$ substituent.

8. A method of making light-sensitive material which comprises coating a base material with a layer comprising an organic colloid and a compound having the formula

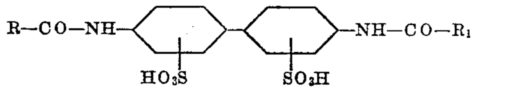

in which R and $R_1$ are quinone-(1,4)-diazide radicals.

9. A method of making light-sensitive material which comprises coating a base material with a layer comprising an organic colloid and a compound having the formula

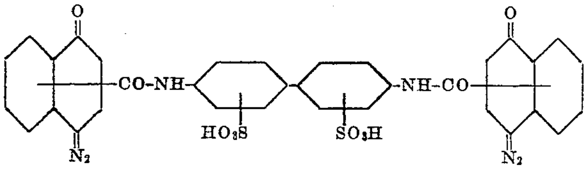

10. A method of making light-sensitive material which comprises coating a base material with a layer comprising an organic colloid and a compound having the formula

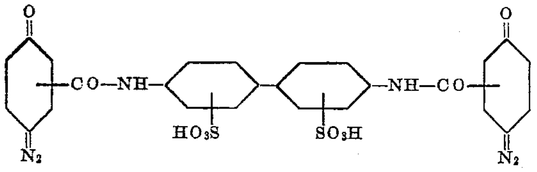

11. A method of making light-sensitive material which comprises coating a base material with a layer comprising an organic colloid and a compound having the formula

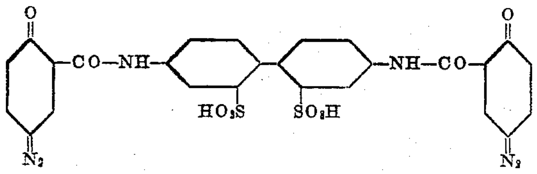

12. A method of making light-sensitive material which comprises coating a base material with a layer comprising an organic colloid and a compound having the formula

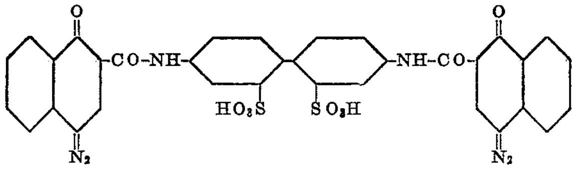

13. A method of developing light-sensitive material which comprises exposing a base material coated with a layer comprising an organic colloid and a compound having the formula $$R—CO—NH—R_2—NH—CO—R_1$$

in which R and $R_1$ are quinone-(1,4) diazide radicals, and $R_2$ is an arylene radical having at least one $—SO_3H$ substituent to light under a master, and treating the exposed plate with water.

14. A method of developing light-sensitive material which comprises exposing a base material coated with a compound having the formula

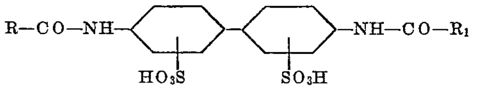

in which R and $R_1$ are quinone-(1,4)-diazide radicals, to light under a master, and treating the exposed plate with water.

15. A method of developing light-sensitive material which comprises exposing a base material coated with a layer comprising an organic colloid and a compound having the formula

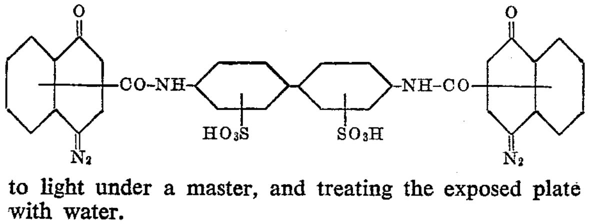

to light under a master, and treating the exposed plate with water.

16. A method of developing light sensitive material which comprises exposing a base material coated with a layer comprising an organic colloid and a compound having the formula

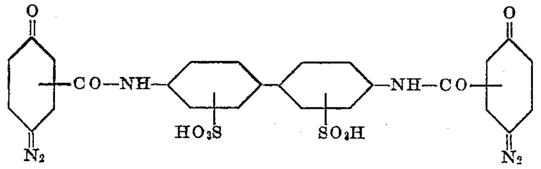

to light under a master, and treating the exposed plate with water.

17. A method of developing light-sensitive material which comprises exposing a base material coated with a layer comprising an organic colloid and a compound having the formula

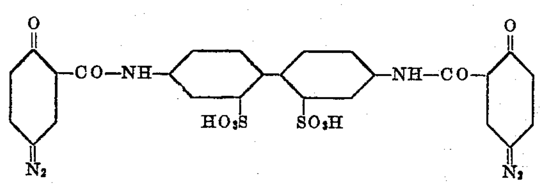

to light under a master, and treating the exposed plate with water.

18. A method of developing light-sensitive material which comprises exposing a base material coated with a layer comprising an organic colloid and a compound having the formula
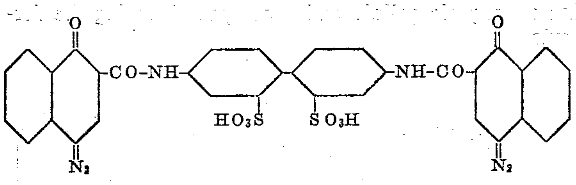
to light under a master, and treating the exposed plate with water.
References Cited in the file of this patent
UNITED STATES PATENTS
2,754,209 Schmidt ---------------- July 10, 1956
FOREIGN PATENTS
706,028 Great Britain ----------- Mar. 24, 1954